(12) United States Patent
Crampton (10) Patent No.: US 8,757,604 B2
(45) Date of Patent: *Jun. 24, 2014

(54) SUPPORT DEVICE AND METHOD OF USE (76) Inventor: David Crampton, Oakworth (GB)

( * ) Notice: Subject to any disclaimer, the term of this patent is extended or adjusted under 35 U.S.C. 154(b) by 723 days.

This patent is subject to a terminal disclaimer.

(21) Appl. No.: 12/936,813

(22) PCT Filed: Apr. 3, 2009

(86) PCT No.: PCT/GB2009/000888
§ 371 (c)(1),
(2), (4) Date: Dec. 9, 2010

(87) PCT Pub. No.: WO2009/125170
PCT Pub. Date: Oct. 15, 2009

(65) Prior Publication Data
US 2011/0095144 A1 Apr. 28, 2011

(30) Foreign Application Priority Data
Apr. 9, 2008 (GB) .................................... 0806435.4

(51) Int. Cl.
*B23Q 3/02* (2006.01)

(52) U.S. Cl.
USPC ......... 269/133; 269/3; 269/6; 269/43; 269/95

(58) Field of Classification Search
USPC .................... 248/149, 122.1, 229.12, 229.22, 248/231.41, 274.1, 316.3, 316.4; 269/133, 269/240, 238, 17, 3, 6, 43, 95
See application file for complete search history.

(56) References Cited

U.S. PATENT DOCUMENTS

| | | | |
|---|---|---|---|
| 342,187 A * | 5/1886 | Cornell | 269/133 |
| 1,715,722 A | 6/1929 | Smith et al. | 269/133 |
| 2,487,742 A * | 11/1949 | Sutter | 269/240 |
| 2,763,302 A | 9/1956 | English | 269/133 |
| 3,861,662 A | 1/1975 | Morse | 269/17 |
| 4,168,827 A * | 9/1979 | Hutchinson | 269/238 |
| 4,270,741 A | 6/1981 | Hurst | 269/17 |
| 5,294,039 A * | 3/1994 | Pai et al. | 228/180.22 |
| 8,104,753 B2 * | 1/2012 | Crampton | 269/133 |

FOREIGN PATENT DOCUMENTS

| | | |
|---|---|---|
| GB | 2 285 595 | 7/1995 |
| GB | 2 402 094 | 12/2004 |
| WO | WO 2007/096570 | 8/2007 |

* cited by examiner

*Primary Examiner* — Todd M Epps
(74) *Attorney, Agent, or Firm* — Norton Rose Fulbright, LLP (57) ABSTRACT

A support device (2) is provided for supporting one or more items (4) in use. The support device includes at least first and second clamping members (6, 8). The clamping members move relative to each other to allow the members to be moved between clamped and unclamped positions. Each clamping member has at least one clamping surface (26, 24) defined thereon, The at least first and second clamping members are arranged with a space (30) defined between the clamping surfaces to allow the one or more items (4) to be located in said space in use and to be clamped therebetween in said clamped position. The support device further includes adjustment means for allowing the space between the clamping surfaces to be adjusted in use. The adjustment means includes user actuation means (231, 233) and actuation of said actuation means causes at least one of said at least first and second clamping members to move relative to the other of said at least first and second clamping members.

12 Claims, 5 Drawing Sheets

SUPPORT DEVICE AND METHOD OF USE

The present application is a national phase application under 35 U.S.C. §371 of International Application No. PCT/GB2009/000888, filed 3 Apr. 2009, which claims the benefit of Great Britain Application No. 0806435.4, filed 9 Apr. 2008. The entire contents of these applications are incorporated by reference.

This invention relates to a support device and method of use thereof.

Although the following description refers almost exclusively to a support device for supporting an item in the form of a door, it will be appreciated by persons skilled in the art that the present invention can be used to support any item, and can be used as a display stand, to support fence posts, to form part of a work surface and/or the like.

Conventionally, if a joiner wishes to plane an edge of a door, the joiner has to balance the door on a suitable surface, support the door with one hand and plane an edge of the door using their other hand. Alternatively, a user has to find a suitable jig to support the door in a required position to allow the user to plane and/or work on the door. Such jigs are generally large and are not easily transportable. Furthermore, the clamping means provided on the jig typically has to be actuated manually, thereby making it difficult for a single person to locate the door in a suitable position and clamp the door in said position simultaneously.

In an attempt to overcome this problem, it is known to provide a support device which allows the device to be moved between clamped and unclamped positions without the user having to manually actuate the support device. For example, in the applicant's co-pending International Patent Application PCT/GB2006/002269, a support device is provided which includes first and second clamping members joined together on a base thereof by a hinge arrangement. A space is defined between clamping surfaces provided on opposing surfaces of the first and second clamping members to allow an item to be clamped to be located between said clamping surfaces and to be removed therefrom. The hinge arrangement is provided substantially centrally of said space. Resilient biasing means are typically associated with the hinge arrangement for biasing the clamping members to a clamped position. The clamping mechanism is typically activated as a result of the weight of the item being located in the space on the hinge arrangement between the clamping members. The unclamping mechanism typically takes place on removal of the weight of the item from the hinge arrangement. As such, heavy items can be easily located with the support device without a user having to free their hands to manipulate the support device.

In order to accommodate different sized objects being located in the space between the clamping members, an adjustment mechanism is provided to allow the size of the space to be adjusted. In PCT/GB2006/002269, the hinge arrangement includes a hinge member with a hinge plate provided either side of the hinge member and each hinge plate is joined to the base of the first and second clamping members. The adjustment mechanism includes a slot defined in one of the hinge plates in which a protrusion member associated with one of the clamping members is slidably located. The protrusion member is in the form of a screw and can be rotatably secured relative to the slot when a pre-determined position, and thus pre-required space between the clamping members, has been achieved.

Other clamping devices are known which incorporate adjustment mechanisms for adjusting the space between clamping members. One such example is disclosed in GB2402094 in which a leaf spring is provided between the clamping members and extends into inner end portions of the clamping members. The leaf spring is permanently secured in one of the clamping members and releasably secured in the other clamping member. More particularly, a plurality of spaced apart apertures are defined in the leaf spring and a rotatable bolt is detachably attached in one of the apertures corresponding to the required spacing between the clamping members. A problem with this mechanism is that the space between the clamping members can only be moved pre-determined distances corresponding to the spacing of the apertures defined in the leaf spring.

A further example of a clamping device with adjustment means is disclosed in U.S. Pat. No. 1,715,722. In this device, slots are defined on an upper surface of the clamping portions and bolts provided on a base member, which the clamping portions are attached to, are slidably mounted in the slots. The clamping portions are moved to a required position and the bolts are secured to maintain their position in the slots. The user has to use a special tool, such as a screw driver, to adjust the bolts and access to the bolts is restricted due to the shape of the clamping portions, thereby making it difficult for a user to adjust the spacing between the clamping portions.

It is therefore an aim of the present invention to provide a support device which overcomes the abovementioned problems.

It is a further aim of the present invention to provide a method of using or adjusting a support device which overcomes the abovementioned problems.

According to a first aspect of the present invention there is provided a support device for supporting one or more items in use, said support device including at least first and second clamping members, said clamping members movable relative to each other to allow said members to be moved between clamped and unclamped position, each clamping member having at least one clamping surface defined thereon, said at least first and second clamping members arranged with a space defined between said clamping surfaces to allow said one or more items to be located in said space in use and to be clamped therebetween in said clamped position, and wherein said support device includes adjustment means for allowing the space between the clamping surfaces to be adjusted in use, characterised in that said adjustment means includes user actuation means and actuation of said user actuation means causes at least one of said at least first and second clamping members to move relative to the other of said at least first and second clamping members.

Preferably actuation of said user actuation means actually drives the movement of the first and/or second clamping members relative to each other or the other member. This makes it both quick and easy for a user to adjust the space between the clamping members, thereby allowing the support device to be easily used to clamp different sized items. In addition, since the user actuation means are provided as part of clamping device, no special tools are required to actuate the adjustment mechanism.

Preferably the at least first and second members are slidably movable relative to each other.

Preferably rotation of the user actuation means allows relative movement or sliding movement between the at least first and second clamping members. The user actuation means are therefore typically rotatably mounted on the support device.

Preferably the first and second clamping members are joined together by attachment means. Further preferably the attachment means includes a hinge or pivot arrangement. In one embodiment actuation of the user actuation means moves the attachment means or hinge or pivot arrangement relative to the first and/or second clamping members.

Preferably the at least first and second clamping members are pivotally or hingedly movable relative to each other. The axis of pivot is preferably substantially perpendicular to the longitudinal axis of the clamping members.

Preferably the attachment means or the hinge or pivot arrangement is provided at or adjacent the base of the clamping members. Further preferably the hinge or pivot component of the hinge or pivot arrangement is located in the space between the at least first and second members.

In one embodiment the hinge or pivot arrangement includes at least one hinge or pivot member or connection, either side of which are hinge plate members extending outwardly therefrom. More particularly, a first hinge plate member is attached or attachable to the first clamping member and a second hinge plate member is attached or attachable to the second clamping member.

Preferably at least one protrusion member is provided on one of the at least first and/or second clamping members or the first and/or second hinge plate members, which is slidably mounted in at least one slot provided on the other of the at least first and/or second clamping members or the first and/or second hinge plate members.

Actuation of the user actuation means typically causes said protrusion member to slide in said slot. Further preferably the sliding motion is in a direction substantially parallel to the longitudinal axis of the support device.

Preferably the at least one slot is defined in a hinge plate member or attachment means and an aperture is also defined in the hinge plate member or attachment means through which the user actuation means at least partly protrudes, thereby allowing user access to the same. The protrusion member is associated with the first and/or second clamping member and protrudes through the slot and is slidable therein.

In one embodiment the protrusion member is in the form of a threaded bolt which is located in a complementary threaded aperture or sleeve defined in the first and/or second clamping member, and further preferably is defined in the base of the first and/or second clamping member. The complementary threaded aperture is typically accessed from an underside surface of the support device. The protrusion can have a head associated with the same which is of larger dimensions than the width of the slot to secure the hinge plate or attachment means to the clamping member.

The user actuation means is typically in the form of a nut, thumb screw or similar rotatable member having a internally threaded surface which is rotatably mounted on a complementary threaded bolt or member located in or with the first and/or second clamping member, and further preferably the base of the first and/or second clamping member. The threaded bolt is preferably located substantially parallel to the longitudinal axis of the clamping member and the rotation of the user actuation means typically moves the same along the length of the threaded bolt in a required direction. Movement of the user actuation means in the aperture of the hinge plate or attachment means causes the hinge plate or attachment means to move in the same direction as the user actuation means moves along the threaded bolt. Rotation of the user actuation means is therefore typically along an axis substantially parallel to the longitudinal axis of the threaded bolt and/or clamping member.

Resilient biasing means are typically associated with the attachment means or hinge and/or pivot arrangement of the support device. The resilient biasing means are preferably in the form of a spring or sprung material, such as a leaf spring and/or the like. The resilient biasing means are typically located adjacent the base of the device. The biasing means biases the support device to the unclamped position.

Preferably one of the first and/or second hinge plates is fixedly attached to the first and/or second clamping members and the other of the first and/or second hinge plates is movably mounted relative to the first and/or second clamping members.

According to a second aspect of the present invention there is provided a method of using a support device for supporting one or more items in use, said support device including at least first and second clamping members, each clamping member having at least one clamping surface defined thereon, said at least first and second clamping members arranged with a space defined between said clamping surfaces to allow said one or more items to be located in said space in use and to be clamped therebetween, said method including the steps of moving the clamping members relative to each other between clamped and unclamped positions using adjustment means for allowing the space between the clamping surfaces to be adjusted, characterised in that said adjustment means includes user actuation means and actuation of said actuation means causes at least one of said at least first and second clamping members to move relative to the other of said at least first and second clamping members.

According to a third aspect of the present invention there is provided a method of construction of a support device.

Preferably at least a part of the one or more items being clamped in the device is located substantially perpendicularly to the longitudinal axis of the support device.

The hinge or pivot arrangement is such that the weight of an item located between the space recess and/or on the hinge or pivot arrangement causes at least a part of said first and/or second clamping members to move towards each other, relative to the other and/or towards the other member to the clamped position. Removal of the weight of the item away from said space or recess and/or said hinge or pivot arrangement causes said first and/or second clamping members to move to an unclamped position, and typically for at least a part of the first and/or second clamping members to move away from each other or from the other member. Thus, in one example it can be seen that the weight of an item due to gravity acting directly or indirectly on the hinge or pivot arrangement allows movement of at least part of the support device between unclamped and clamped positions and no additional user actuation means are required, thereby allowing hands free use of the support means. Preferably the weight of the item acts against the resilient biasing force of the hinge or pivot arrangement or attachment means.

Each of said first and second clamping members typically includes a base, side walls and/or end walls and a top. In one embodiment the hinge or pivot arrangement is located at or adjacent the base of said first and/or second clamping members. The top or opposing edges of said tops can move towards each other when the weight of an item is located in said space or recess and/or on said hinge or pivot arrangement.

Preferably the clamping members are located end to end to form an elongate support device with the longitudinal axis of the members preferably being substantially co-axial. The space for the one or more items is defined between opposing ends of the clamping members.

Preferably a base of the first and/or second clamping member is provided substantially horizontally or substantially parallel to a surface on which the support device is placed in the clamped position. The base of said first and/or second clamping members can be movable to an acute angle to the horizontal in the unclamped position in one embodiment. The base can be in direct engagement with a surface on which the items are to be supported or indirectly via one or more support feet.

Preferably the hinge element or pivot point of said arrangement is provided substantially centrally in the recess or space between the clamping surfaces of said clamping members.

Preferably one or more support feet are provided on or adjacent the base of said first and/or second clamping members and said support feet allow the support device to be supported even when in the clamped position (i.e. and even when a part of the support device is at an acute angle to the horizontal).

Preferably the one or more support feet are located at or adjacent a free end of said first and/or said clamping members.

Thus, for example, the first and second clamping members each have a first end which is pivotably or hingedly mounted to the first end of the other member. The opposing free ends of said first and/or second members can be moved from a lowered position to a raised position when in the clamped position and said support feet help to maintain contact with the floor surface on which the support device is being used.

The one or more support feet can include one or more discs, protruding members and/or the like.

One or more of the support feet can protrude outwardly of the first and/or second members to provide sufficient support to the support device and to prevent the device from toppling over in use. For example, the support feet can protrude from one or both sides of the first and/or second clamping members, and further preferably in a direction substantially transversally thereof to increase the surface area at the free ends of the members in contact with the support on which the support device is placed in use.

Preferably the one or more items are in the form of a door and the support device allows the door to be clamped in a suitable position so that a user can plane and/or work on the door. Any number of support devices can be used to support one or more items as required. A plurality of support devices can be located a spaced distance apart with respect to the item being supported.

In a further example, at least two support devices are located a spaced distance apart and an upright item can be clamped in each. A further member can be located on top of and between the upright members to form a work surface if required.

In one embodiment a plurality of support devices are connected together by one or more connection arms. The one or more connection arms can be substantially flexible but in a preferred embodiment are substantially rigid.

In one embodiment the one or more connection arms can be telescopic in form to allow the distance between the two or more connected support devices to be adjusted accordingly. The telescopic connection arm typically includes two or more members which are slidably movable relative to each other. At least one of said members is substantially hollow to allow another member to be movably mounted therein.

Each end of a connection arm can be connected to a support device and in one embodiment each end is located in a substantially complementary shaped aperture in a side or adjacent a base of a clamping member or the support device.

The connection arms can be integral with, fixedly attached or detachably attached to the support device and/or clamping member as required. The arms can be connected to the clamping members via any suitable attachment means, such as welding, adhesive, one or more screws, nut and bolt, clips, friction fit and/or the like.

Preferably the connection arms are located towards a free outer end of the clamping members.

The connection arms are typically substantially elongate and linear in form but can be any suitable shape as required.

According to a further aspect of the present invention there is provided support apparatus including two or more support devices connected together by one or more connection arms. The support device can be of a type including at least first and second clamping members and any or any combination of the above described features. The connection arms can be used on any support device independently of the adjustment means if required or in combination with the adjustment means.

The hinge or pivot arrangement and thus the first and second clamping members can be movable from an extended position, wherein the bases of the members are substantially co-planar and a spaced distance apart from each other (for example the bases can be arranged at approximately 180 degrees to each other), to a substantially folded or storage position, wherein the bases of the clamping members can be moved towards each other such that they are substantially parallel and adjacent to each other. In the storage position, the support device is relatively compact and can be easily transported and stored. Engagement means can be provided to allow the support device to be maintained in the extended position and/or storage position as required.

Movement of the first and second clamping members from the extended position to a folded or storage position is typically in an opposite direction to movement of the first and second clamping members from the extended position to a clamped position. Thus, the pivot and/or hinge arrangement can be capable of moving through 0-360 degrees in one embodiment.

The opposing support surfaces of said first and second clamping members are typically moved towards each other on movement from an unclamped position to a clamped position and are moved away from each other on movement from an unclamped or extended position to a folded/storage condition.

It is to be noted that an item can be suitably supported using the support device when the members are in an extended and unclamped position since the opposing upper edges of the members do not have to necessarily move towards each other in order to sufficiently clamp or engage the item.

In one embodiment the first and second clamping members and/or opposing support surfaces of said first and second members are biased away from each other to the unclamped position, via the resilient biasing means. As such, the biasing means can be provided to bias the pivot or hinge arrangement to the unclamped position. This allows the support device to move towards an unclamped position once the weight of the item has been removed from the support device without a user having to manually actuate release of a separate clamping mechanism.

One or more inserts can be attached, and preferably detachably attached to one or more of the clamping surfaces to allow the size of the space between the clamping members to be adjusted. This also allows the clamping force to be adjusted and allows the support device to be universal for use with any size and/or shaped item or items. The one or more inserts can be formed from any suitable material and, in one embodiment, is formed from a substantially resilient material, such as rubber, foam and/or the like. This method of adjustment can be in addition to the earlier described method of horizontal or lateral adjustment.

Preferably the engaging surface of the one or more inserts and/or clamping surfaces which engages a surface of the item to be supported in use is provided with gripping means thereon to allow an item to be gripped between the first and second members. The gripping means can include one or more dimples, protrusions and/or the like provided on the surface as required.

In one embodiment the inserts can be tapered in form to provide an angled surface in the recess, thereby allowing increased gripping force to be applied at the base and/or top of the recess.

The first and second clamping members can be any suitable shape, design and/or size and can be formed from any suitable material. The height and/or size of the clamping surfaces of said first and second clamping members are such so as to provide sufficient support for an item located against said clamping surface in use. In one embodiment the first and/or second clamping members are substantially elongate in form and can be the same and/or different lengths as required.

The hinge or pivot arrangement, and preferably the hinge plate or plates, can be attached to the first and second clamping members via any suitable attachment means. The attachment means can include any or any combination of one or more screws, nuts and bolts, rivets, welding, adhesive, clips, inter-engaging members and/or the like. The hinge or pivot arrangement can be detachable with the first and/or second clamping members if required. For example, a pin through the hinge arrangement can be detachably attached to allow the hinge to be separated if required for storage and/or transportation purposes.

In one embodiment height adjustment means can be provided on the first and/or second clamping members. The height adjustment means can allow the first and/or second clamping members to rise or lower in use. The height adjustment means can bias the members to a raised position prior to an item being located with the support device and can allow gradual lowering of the members when the weight of an item of located with said members.

Preferably movement means can be associated with the first and/or second members to allow movement of the support device across a surface in either the clamped and/or unclamped position. The movement means can include one or more wheels, rollers, ball bearings and/or the like.

Embodiments of the present invention will now be described with reference to the accompanying figures, wherein.

Figure 3A:
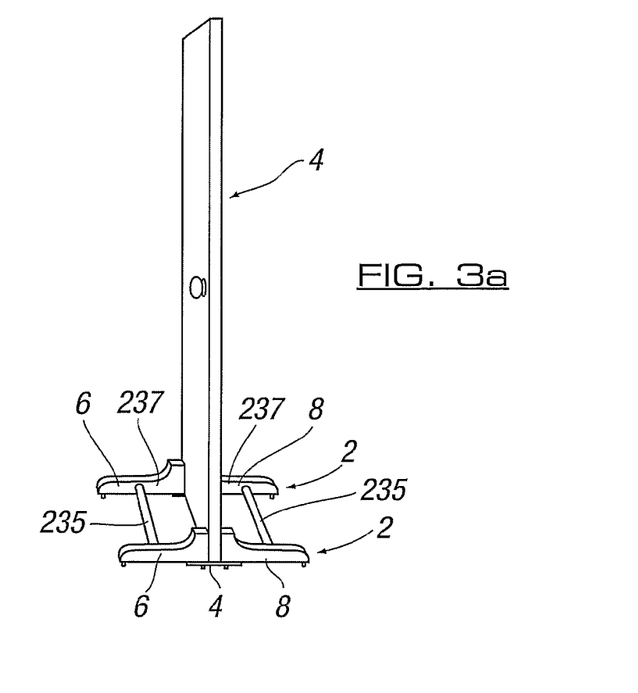
FIGS. 3*a* and 3*b* illustrate use of a plurality of support device for supporting a door in an upright position and on its side respectively.
Figure 3B:
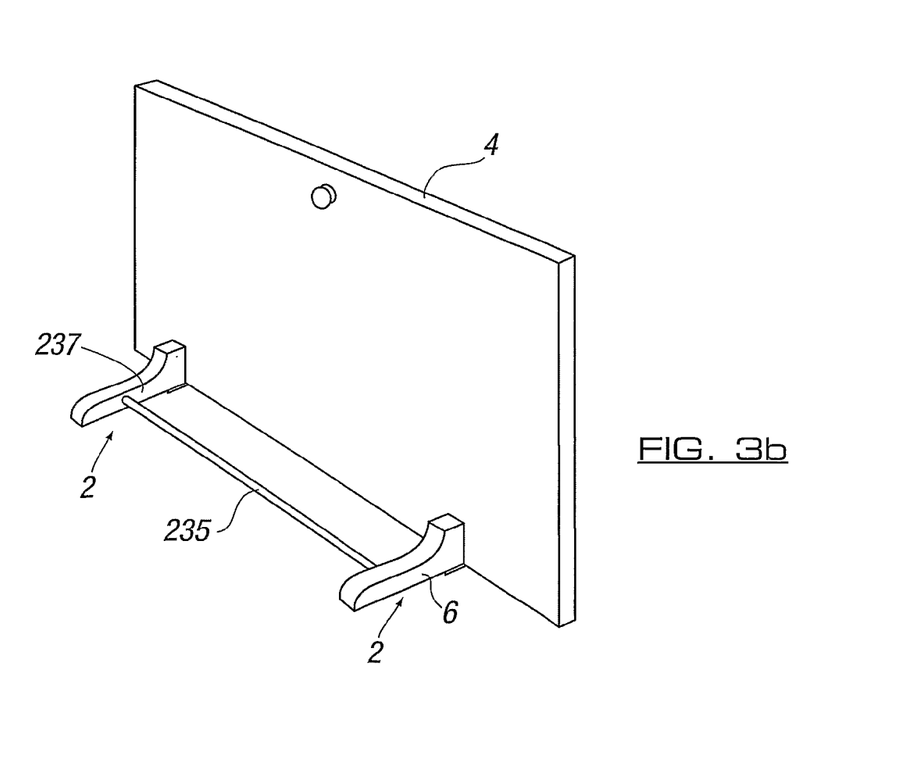

Referring to the figures, there is illustrated a support device in the form of a door support device 2 for supporting a door 4 in use in either an upright position, as shown in FIG. 3*a*, or a side position, as shown in FIG. 3*b*. With the door supported in the manner shown, a user can easily plane and/or work on the door.

Each support device 2 includes a first clamping member 6 and a second clamping member 8. Each clamping member 6, 8 is joined together adjacent opposing ends 10, 12 via a hinge 14. More particularly, hinge 14 includes a first plate portion 16 joined to base 18 of clamping member 6 via suitable attachment means and a second plate portion 20 joined to base 22 of clamping member 8 via suitable attachment means in the form of screws as will be described in more detail below. A hinge or pivot element 24 is provided centrally between plate portion 16 and 20. The attachment means of one of the plate portions can include any or any combination of welding, adhesive, one or more screws, nuts and bolts, clips, ties, inter-engaging members and/or the like. The attachment means of the other plate portion will be described with reference to FIGS. 6*a*-6*d* below.

Opposing end clamping surface 26, 28 of each clamping member 6, 8 are provided a spaced distance apart to form a recess or space 30 therebetween. Recess 30 is of such dimensions so as to allow a door to be located between the same. With a door located in recess 30, at least a part of end surfaces 26, 28 engage against the outer surfaces of the door to support the door.

Figure 1:
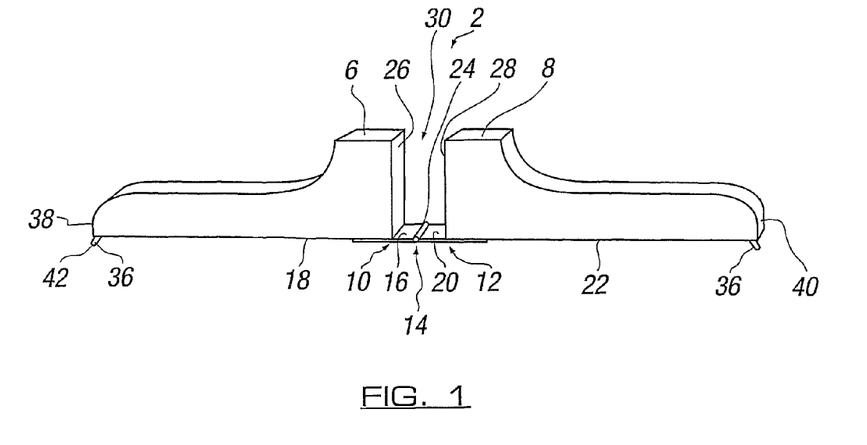
FIG. 1 is a perspective view of a support device according to an embodiment of the present invention in an in-use position.
Figure 2:
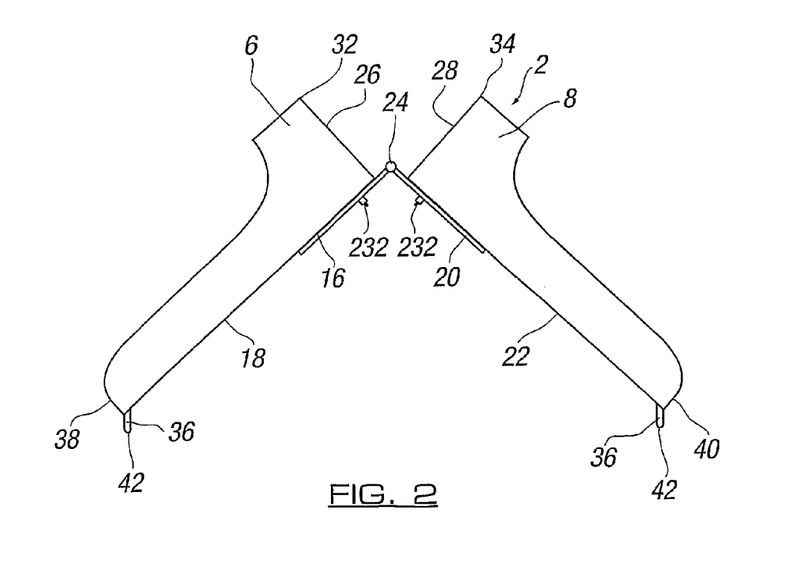
FIG. 2 is a front view of support device in a partially folded or storage position.

Each plate portion 16, 20 of hinge 14 is capable of movement in a clockwise or anti-clockwise direction and typically through approximately 0-360 degrees. As such, end surfaces 26, 28 of clamping members 6, 8 can also be moved towards each other or away from each other. More particularly, each clamping member can be moved about hinge 14 between a storage or folded condition (as partially shown in FIG. 2), and an erect condition (as shown in FIG. 1). In the storage condition, bases 18, 22 of clamping members 6, 8 are adjacent and substantially parallel to each other, thereby providing a compact and easily transportable device. In the erect condition, bases 18, 22 are substantially co-planar when the device is not being used to clamp an item and opposing end surfaces 26, 28 are a spaced distance apart and substantially parallel to each other.

Figure 4:
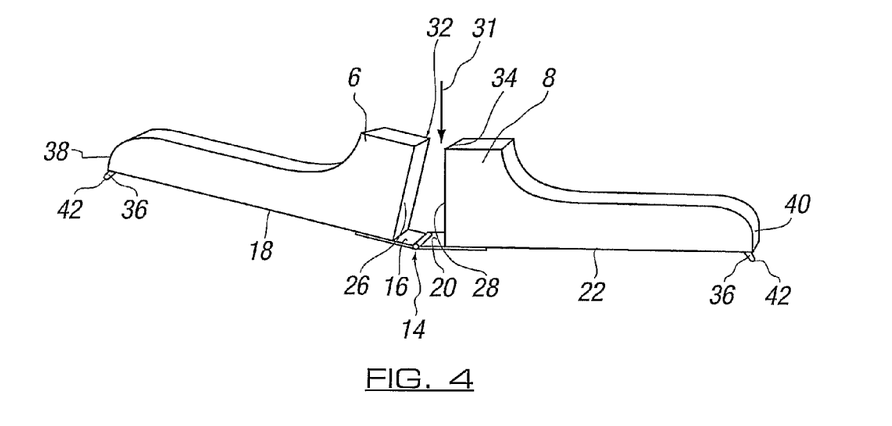
FIG. 4 illustrates movement of the support device towards a clamped position when weight in the form of an item to be supported is placed on the support device in one embodiment.

With the support device in the erect condition, an edge of a door can be located in recess 30 and, once the weight of a door (as shown by arrow 31 in FIG. 4) is placed on hinge 14, this causes hinge 14 to depress towards the surface on which the support device is located. At the same time, top edges 32, 34 of clamping members 6, 8 move towards each other and engage against a surface of the door, thereby clamping the door in position. If a user lifts the door from the support device, weight 31 is removed from hinge 14, thereby causing clamping members 6, 8 to pivot from the clamped position to the extended, unclamped position.

Biasing means can be associated with hinge 14 to allow the support device to return automatically to the unclamped position or extended position as soon as an item is disengaged from hinge 14.

Support feet 36 are provided on bases 18, 22 adjacent the free ends 38, 40 thereof. The support feet 36 raise clamping members 6, 8 a spaced distance above a floor surface on which the support device is placed in use, thereby allowing the base portions of clamping members 6, 8 adjacent ends 10, 12 thereof to move towards the ground surface on depression of hinge 14 on clamping of an item in the support device. The free ends 42 of feet 36 maintain contact with the ground surface as free ends 38, 40 of the members are moved to a raised position.

Figure 5:
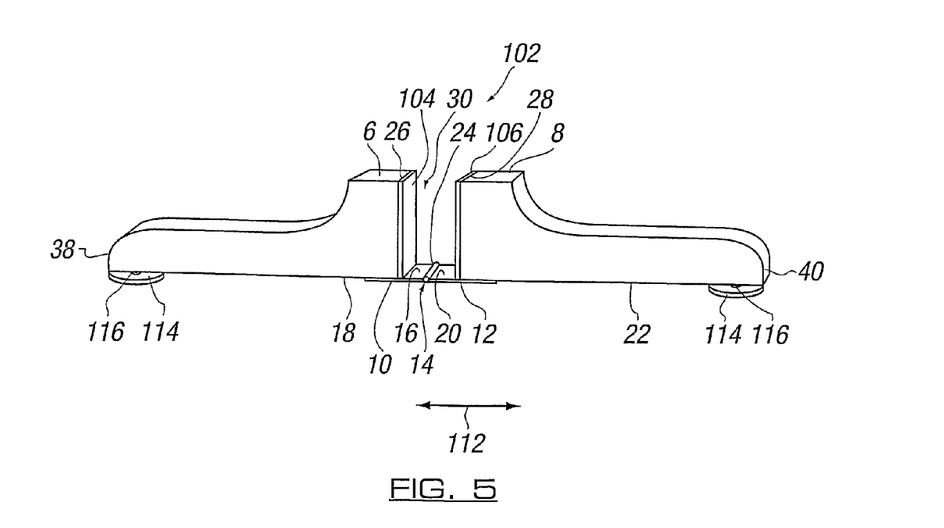
FIG. 5 illustrates a support device according to an alternative embodiment of the present invention.

With reference to FIG. 5, a further example of a support device 102 is illustrated. Detachable inserts 104, 106 are locatable adjacent clamping end surfaces 26, 28 to allow the size of recess 30 to be adjusted to fit different sized doors and/or to allow adjustment of the clamping force applied to a door.

Adjustment means can be provided on base 18 and/or 22 to allow member 8 to be moved relative to member 6 and/or vice versa in a substantially longitudinal direction, as shown by arrow 112. This allows the size and/or width of recess 30 to be adjusted to allow the clamping pressure to be adjusted and to allow the device 102 to fit different sized items. The adjustment mechanism will be described in more detail below with reference to FIGS. 6a-6d.

Support feet in the form of rotatable discs 114 are attached to the base 18, 22 of clamping members 6, 8 at the free ends 38, 40 thereof. Rotation of discs 114 about attachment screw 116 can allow the height of disc 114 relative to base 18, 22 to be adjusted. As such, with discs 114 in contact with a surface on which the device is placed, members 6, 8 can be raised and lowered as required with respect to the surface. The discs 114 typically provide a larger surface area than free ends 38, 40 to engage with the floor surface to prevent the device 102 from being knocked over in use. Discs 114 protrude either side of members 6, 8. Alternatively, discs 114 can be fixed relative to base 18, 22.

Clamping members 6, 8 are substantially elongate in form and extend substantially perpendicularly either side of a surface of an item being engaged in recess 30. They can be any suitable shape, size and/or design as required.

Referring to FIGS. 6a-6d, there is illustrated an adjustment mechanism according to an embodiment of the present invention. The underside surface of base 202 of a first clamping member 204 is shown for the purposes of clarity in FIG. 6a. The base 202 includes a clamping surface 206 located at an end 208 for location adjacent a second clamping member (not shown). The opposite free end 210 is provided with a support foot in the shape of a partial disc 212. A recess 214 is defined in base 202 and includes a plurality of sleeve members 216 supported by strengthening ribs 218 in said recess. The longitudinal axis of the sleeve members is typically provided substantially perpendicular to the longitudinal axis of the clamping member 204.

Figure 6A:
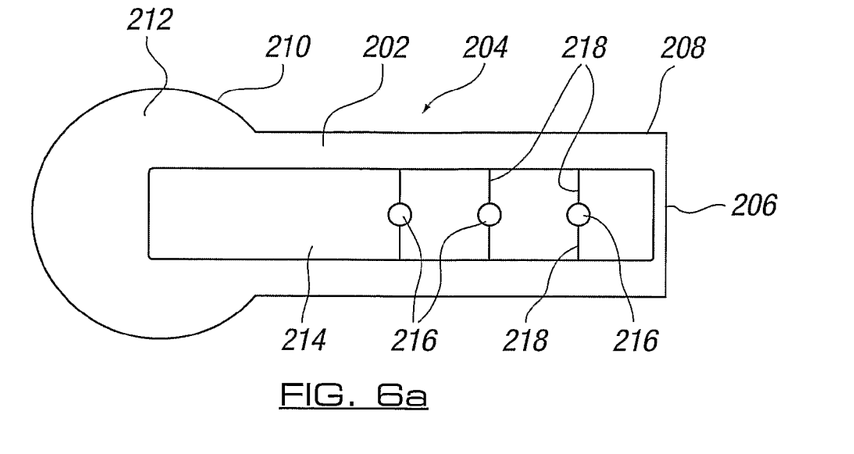
FIGS. 6*a*-6*d* illustrate an example of an adjustment mechanism according to a further embodiment of the present invention.
Figure 6B:
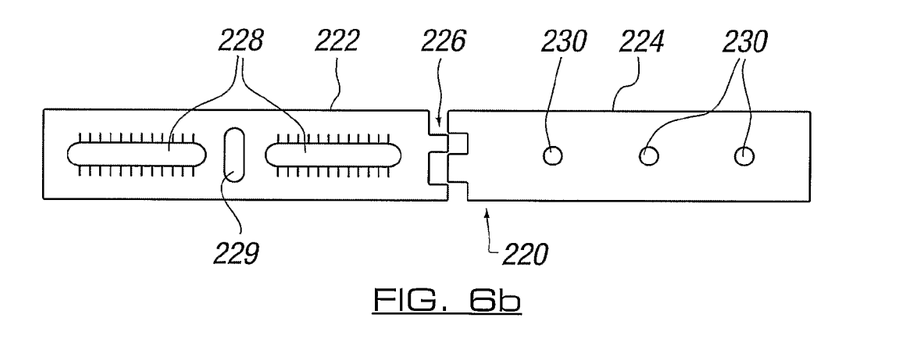

An example of a hinge arrangement 220 is shown in FIG. 6b. Hinge arrangement 220 includes a first hinge plate 222 and a second hinge plate 224 with a hinge connection 226 joining the two plates together. In this illustrated example the hinge connection is provided substantially centrally of the first and second hinge plates. First hinge plate 222 includes spaced apart elongate slots 228 defined substantially parallel to the longitudinal axis of said element. A further slot 229 is located between slots 228 and the longitudinal axis of this slot 229 is substantially perpendicular to the longitudinal axis of slots 228. Second hinge plate 224 includes a plurality of attachment apertures 230 located at spaced apart intervals along to the longitudinal axis of the plate for attachment via a bolt located through the apertures 230 to the base of the second clamping member.

Figure 6C:
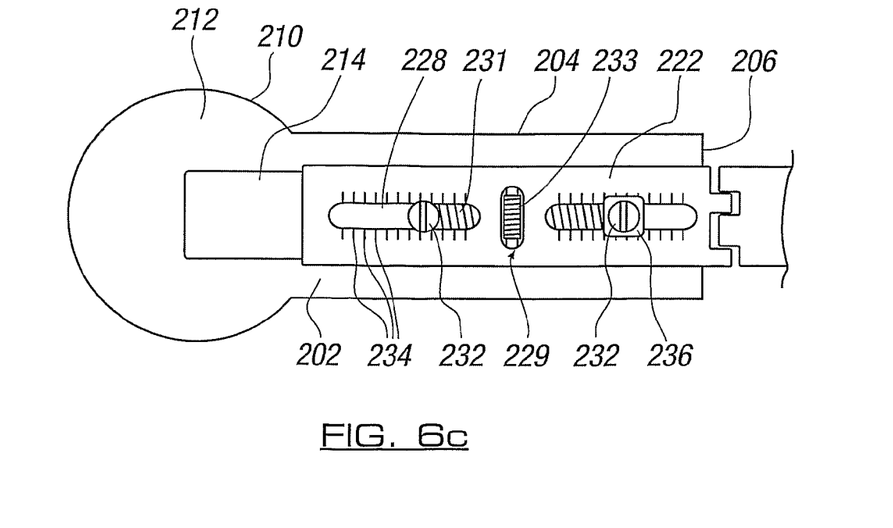
Figure 6D:
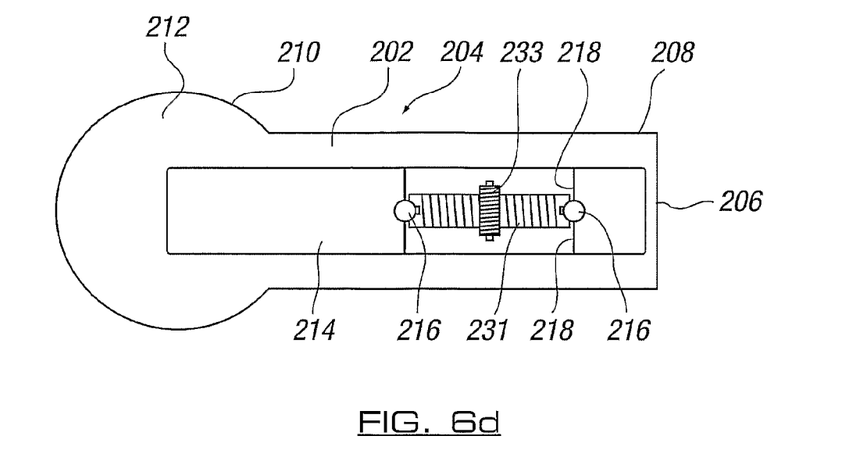

Referring to FIG. 6d, a threaded bolt 231 which is substantially elongate in form is provided substantially parallel to the longitudinal axis of first clamping member 204 and between adjacent sleeves 216. The bolt 231 can be fixed using any suitable means, such as friction fit, adhesive, welding and/or the like. User actuation means in the form of a rotatable nut 233 is rotatably mounted on threaded bolt 231. More particularly, an inner surface of nut 233 is provided with a complementary screw thread to bolt 231. As such, nut 233 can be rotated along the length of bolt 231 between sleeves 216 via a user in either direction.

Referring to FIG. 6c, when hinge plate 222 is fixed to the base of first clamping member 204, protrusion members in the form of bolts 232 are located through sleeves 216 and slots 228 and secured via a complementary screw thread arrangement in sleeves 216, thereby securing the hinge plate at a suitable position on base 202 and defining the spacing between clamping surface 206 and the clamping surface of the second clamping member. The heads of bolts 232 preferably extend over one or more edges of the hinge plate surface defining slots 229 to prevent the hinge plate from becoming detached from the clamping member. When a user wishes to adjust the distance between the two opposing clamping surfaces of the clamping members and thus adjust the space, the user loosens bolts 232, thereby allowing bolt 232 to be slidable in slot 228. This sliding motion is actuated by a user rotating nut 233 in slot 229 in a direction substantially transverse to the direction of sliding motion. This causes nut 233 to move in a forwards or rearwards direction (left to right) along bolt 231 depending on whether nut 233 is rotated in an upwardly or downwardly direction, thereby causing hinge plate 222 to move, which causes bolt 232 to slide along slot 228. Once a required position has been achieved, the bolt 232 is tightened and secured to prevent further movement of the bolt in slot 228. Thus, actuation of nut 233 drives movement of bolt 232 in slot 229, thereby making adjustment of the clamping members both quick and easy to achieve.

The components of the present invention can be formed from any suitable material, such as plastic, metal, rubber, wood and/or the like.

A plurality of support devices can be joined together in a spaced apart and substantially parallel arrangement using connection means in the form of elongate connection arms 235, as shown in FIGS. 3a and 3b. The connection arms are typically rigid in form and are joined to each opposing side wall 237 of the clamping members of opposite support devices. The connection arms can be detachably attached if required and can be telescopic in form to allow the distance between adjacent support devices to be adjusted as required.

Figure 7A:
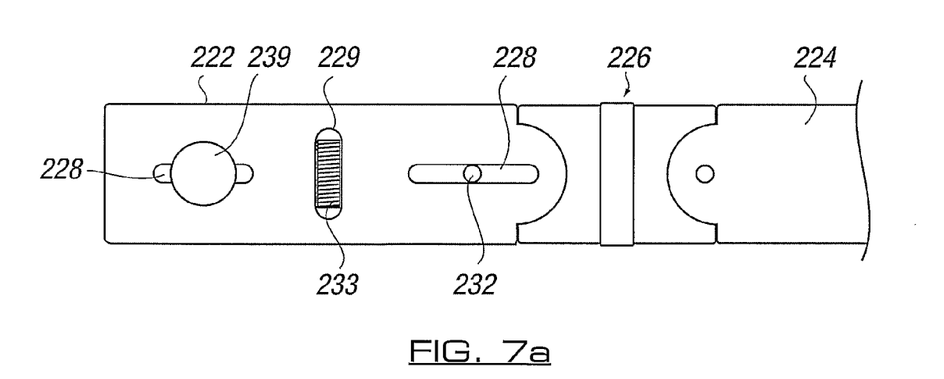
FIGS. 7*a*-7*b* illustrate a plan view of the base and a cross sectional view of the base portion respectively of a further embodiment of the present invention.
Figure 7B:
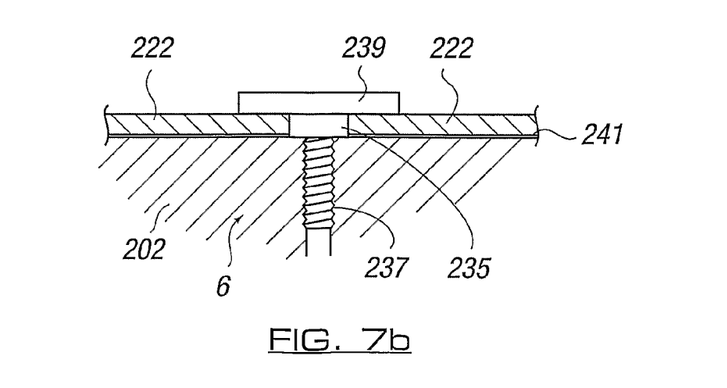

Referring to FIGS. 7a-7b, in one embodiment a head or free end portion of the protrusion member movably mounted in slot 228 is in the form of a slotted screw, thumb screw or similar attachment member having a shoulder portion 235 located above and extending outwardly of threaded portion or attachment portion 237. The shoulder portion 235 is located below a head portion 239 and ensures a pre-determined gap 241 is provided between the base 202 of the clamping member 6 and the base of hinge plate 222, thereby allowing free, unobstructed movement of hinge plate 222 relative to base 202. A slot can be defined in screw head 239 and can be of sufficient size to allow a coin, working end of a tool or other suitable object to be located therein to allow rotation of the slotted screw to move the same between released and secured positions. In the released position, the hinge plate can move relative to the clamping member or base 202 on rotation of member 233. In the secured position, the hinge plate is prevented from moving relative to base 202 on rotation of member 233. However, in a preferred embodiment a thumb screw is used so that no additional adjustment tools are required.

The invention claimed is:

1. A support device for supporting one or more items in use, said support device including:
    (a) at least first and second clamping members joined together via a pivot or hinge arrangement, said pivot or hinge arrangement including a first hinge plate attached to the first clamping member and a second hinge plate attached to the second clamping member, said clamping members being movable relative to each other to allow said members to be moved between clamped and unclamped positions, each clamping member having at least one clamping surface defined thereon, said at least first and second clamping members arranged with a space defined between said clamping surfaces to allow said one or more items to be located in said space in use and to be clamped therebetween in said clamped position; and (b) an adjustment member for allowing the space between the clamping surfaces to be adjusted in use, characterised in that said adjustment member includes a user actuator, wherein actuation of said actuator causes the hinge or pivot arrangement attached to the first or second clamping members to move relative to the other of said at least first and second clamping members, wherein a protrusion member is provided on one of the at least first and second clamping members or the first or second hinge plates which is slidably mounted in a slot provided on the other of the at least first or second clamping members or the first or second hinge plates.

2. The support device of claim 1, wherein actuation of said user actuator causes sliding movement of said first or second clamping members.

3. The support device of claim 1, wherein rotation of the user actuator allows relative movement of the at least first and second clamping members.

4. The support device of claim 1, wherein actuation of the user actuator causes said protrusion member to slidably move in said slot.

5. The support device of claim 4, wherein the protrusion member is slidable in said slot in a direction substantially parallel to the longitudinal axis of the support device.

6. The support device of claim 5, wherein a head or free end portion of the protrusion member has a shoulder portion located between the head portion and an attachment portion, the shoulder portion providing a pre-defined gap between the head portion and attachment portion to allow unobstructed movement of the hinge plate with respect to a clamping member, the head portion has a slot defined therein sufficient to allow a working end of a tool or coin to be located therewith.

7. The support device of claim 1, wherein one of the first or second hinge plates is fixedly attached to the first or second clamping members and the other of the first or second hinge plates is movably mounted relative to the first or second clamping members.

8. The support device of claim 1, wherein the protrusion member is in the form of a threaded bolt which is located in a complementary threaded sleeve or aperture defined in the first or second clamping member.

9. The support device of claim 1, wherein resilient biasing members are associated with the attachment members for biasing the support device to an unclamped position.

10. The support device of claim 1 wherein one or more apertures are defined in a side wall of the first or second clamping member and a connection member is inserted or insertable therein to allow a further support device to be joined thereto.

11. The support device of claim 10, wherein the connection member is telescopic.

12. A method of using a support device for supporting one or more items in use, said support device including at least first and second clamping members joined together via a pivot or hinge arrangement, said pivot or hinge arrangement including a first hinge plate attached to the first clamping member and a second hinge plate attached to the second clamping member, each clamping member having at least one clamping surface defined thereon, said at least first and second clamping members arranged with a space defined between said clamping surfaces to allow said one or more items to be located in said space in use and to be clamped therebetween, said method including the steps of moving the clamping members relative to each other between clamped and unclamped positions using an adjustment member for allowing the space between the clamping surfaces to be adjusted, characterised in that said adjustment member includes a user actuator and wherein actuation of said actuator causes the hinge or pivot arrangement attached to the first or second clamping members to move relative to the other of said at least first and second clamping members, wherein a protrusion member is provided on one of the at least first and second clamping members or the first or second hinge plates which is slidably mounted in a slot provided on the other of the at least first or second clamping members or the first or second hinge plates.

* * * * *